United States Patent
Rukonic

(10) Patent No.: US 9,741,059 B1
(45) Date of Patent: Aug. 22, 2017

(54) SYSTEM AND METHOD FOR MANAGING WEBSITE SCRIPTS

(71) Applicant: Intuit Inc., Mountain View, CA (US)

(72) Inventor: Marko Rukonic, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 542 days.

(21) Appl. No.: 14/286,157

(22) Filed: May 23, 2014

(51) Int. Cl.
*G06Q 30/04* (2012.01)

(52) U.S. Cl.
CPC .................................. *G06Q 30/04* (2013.01)

(58) Field of Classification Search
CPC ........ G06Q 30/04; G06Q 40/02; G06Q 20/22; G06Q 30/0603; G06Q 20/02; G06F 17/30873
USPC .......... 705/34, 26.8, 26.1, 39; 715/738, 769, 715/226
See application file for complete search history.

(56) References Cited

U.S. PATENT DOCUMENTS

| | | | | |
|---|---|---|---|---|
| 2002/0023112 A1* | 2/2002 | Avital | .................. | G06F 17/21 715/234 |
| 2008/0215426 A1* | 9/2008 | Guldimann | ............ | G06Q 30/02 705/14.61 |
| 2009/0288012 A1* | 11/2009 | Hertel | ..................... | G06Q 20/02 715/738 |
| 2010/0030578 A1* | 2/2010 | Siddique | ............ | G06Q 10/0637 705/3 |
| 2013/0054404 A1* | 2/2013 | Garcia | ............... | G06Q 30/0603 705/26.3 |
| 2013/0204746 A1* | 8/2013 | Lee | ........................ | G06Q 10/06 705/26.62 |
| 2013/0212387 A1* | 8/2013 | Oberheide | ............. | H04L 63/08 713/168 |
| 2013/0346172 A1* | 12/2013 | Wu | .................... | G06Q 30/0214 705/14.16 |

OTHER PUBLICATIONS

Rukonic et al., "System and Method for User Contributed Website Scripts," U.S. Appl. No. 14/291,248, filed May 30, 2014.
Rukonic, "System and Method for Two-Tiered User Contributed Website Scripts," U.S. Appl. No. 14/303,709, filed Jun. 13, 2014.

* cited by examiner

*Primary Examiner* — Vanel Frenel
(74) *Attorney, Agent, or Firm* — Hawley Troxell Ennis & Hawley LLP; Philip McKay

(57) ABSTRACT

A system and method for managing website scripts includes operations which provide for selection and automatic management of community contributed website scripts in order to provide efficient operation for consumer users and computing systems providing services on their behalf. Periodically, at least once during each refresh period, one or more website scripts are selected to be automatically performed on a biller website, based on a predetermined priority, and if the selected script performs successfully for a given user account, no further script operations are required to be performed on the same website for that particular user account, during that same refresh period.

A system and method for managing website scripts further includes decommissioning operations which provide for automatic decommissioning of community contributed website scripts that are functioning below a predetermined minimum performance threshold level.

41 Claims, 3 Drawing Sheets

SYSTEM AND METHOD FOR MANAGING WEBSITE SCRIPTS

BACKGROUND

Computing systems are ubiquitous, and serve the needs of computing system users throughout the world. Application programs of all types have been developed to execute on those computing systems to help those computing system users in a wide variety of tasks.

Some application programs, in the area of personal finance for example, are developed with the consumer focus, and thus execute, for example on computing systems owned and/or operated by consumers. Some of those consumer focused personal finance application programs interface with other computing systems, such as banking related computing systems, to download, analyze, and otherwise operate with user specific banking data associated with the user.

Other computing systems have been implemented which have application software designed to serve many consumers at a time. In the area of personal finance, for example, Mint™ of Intuit Inc, is regularly used by many consumers to acquire and analyze or otherwise operate on their financial data. Exemplary tasks that consumers perform using Mint™, for example, include paying bills, analyzing and tracking their expenses, and preparing and tracking budgets.

In the example of paying bills, such third-party computing systems typically use consumer provided data about merchants and others who send them bills, also called billers, when the consumer indicates that they wish to pay a bill. In a typical scenario, a consumer provides the third-party computing system with biller data such as the biller's name address and phone number, how much the consumer wishes to pay the biller, and a date when the payment should be made.

There are many types of businesses that consumers may wish to pay using bill pay functionality of personal finance software. Some of those businesses may interact with a consumer's bank or bill pay service, providing information such as how much is owed in a particular payment and when that payment is due. However, other businesses may not be affiliated with the consumer's bank. For those businesses that are not affiliated with the consumer's bank, the consumer must typically provide the data themselves.

Some businesses that consumers do business with, such as electric and gas utility businesses, phone companies, mortgage companies, automobile loan companies, and any other business that the consumers do business with may provide webpages of the business which allow interested parties to gather data about the business, and which may further allow consumers of the business to become authorized to view special pages within the webpages of the business which are specifically directed to account statuses of the consumer, balances of the consumer, when a last payment was made by the consumer to the business, the amount of that last payment, and other details which may be important to consumers.

In some situations, a large number of consumers have one or more accounts with a third-party computing system providing a financial management application program to assist those consumers. If enough of those consumers do business with a particular business having a website, such as a utility company, there may be enough justification for the application developers associated with the third-party computing system to develop a website scraping process through which consumer-specific business data associated with those consumers may be gathered from areas of the business website dedicated to providing the user data about their accounts.

Screen scraping processes are very tedious to create, since they must typically operate for a very large number of users, in order to justify the amount of work required in creating the screen scraping processes. Typically, an application program has a single large screen scraping process which handles a large number of webpages and many different conditions which may be associated with many different consumers. Further, a webpage produced for one user may look differently than the same webpage produced for a different user. A website may appear to be a single webpage, but a screen scraping must treat each different version of a page as a different webpage, or a different website. Because of the wide variety of situations that the various consumers may be in with respect to the business, or because the business website provides different views to different customers, a typical screen scraping process, such as described above, requires lots of testing and branching, to ensure that all conditions for all consumers are satisfied by the one screen scraping process.

Screen scraping processes such as described above also typically require constant update due to the structure or other details of the webpages being changed, for one reason or another. Further, due to the large number of potential businesses that have websites that provide user data to users, the number of different screen scraping processes that would be needed to satisfy the large number of consumers using a large number of businesses is typically more than a standard development team can manage. Therefore, screen scraping processes are typically only developed to operate on websites where a very large percentage of the customer base does business.

It would therefore be beneficial to have a system whereby many contributors could create website scripts for gathering data from various websites those contributors use.

It would also be beneficial for the system to include processes to manage those user contributed website scripts.

SUMMARY

A system and method for managing website scripts includes operations which select website scripts for user use and for automatic use based on certain predetermined criteria. The system and method for managing website scripts further includes operations to determine whether a website script should be decommissioned, and thus rendered unavailable for use by consumers and automatic processes.

In one embodiment, a system and method for managing website scripts includes at least one computing processor and at least one memory coupled to the at least one computing processor, the at least one memory having stored therein computing processor executable instructions which when executed by the at least one computing system perform a process for managing website scripts.

In one embodiment, the process for managing website scripts includes receiving website scripts from two or more consumer computing system users, the website scripts each being associated with a biller website and configured with one or more scripting operations for gathering data from one or more webpages of the biller website.

In one embodiment, the process for managing website scripts includes selecting a user account to process, the user account being of a third party computing system, and associated with a user of the third party computing system. In one embodiment, the selected third party user account includes data indicating one or more biller accounts of the user, with a respective number of billers having respective biller websites configured to present user data of the user.

In one embodiment, the process for managing website scripts includes selecting, from the one or more biller websites associated with the selected third party user account, a biller website to gather user data from, the selected biller website having two or more website scripts available for use in gathering, following authentication of a given user as an authorized user, user data from the selected biller website, the two or more website scripts each being biller website specific.

In one embodiment, the process for managing website scripts includes determining whether user data of the third party account includes user data indicating whether one or more of the two or more website scripts associated with the selected biller website has been previously successfully used by or on behalf of the user to gather user data from the associated biller website.

In one embodiment, if user data of the third party account includes data indicating that a particular website script of the two or more website scripts associated with the selected biller website has been previously successfully used by or on behalf of the user to gather user data for the user, the process for managing website scripts further includes selecting a website script from the one or more of the two or more website scripts associated with the selected biller website that have been previously successfully used to gather user data on behalf of the third party user account.

In one embodiment, the selected website script is a website script which has been more recently successfully used on behalf of a given user than any other website script associated with the selected biller website.

In one embodiment, if user data of the third party account does not include data indicating that any of the two or more website scripts associated with the selected biller website have been previously successfully used to gather user data by or on behalf of the user, the process for managing website scripts further includes, selecting a website script from the two or more website scripts associated with the selected biller website, based on a predetermined priority.

In one embodiment, the process for managing website scripts further includes performing the selected website script on the selected biller website.

In one embodiment, the process for managing website scripts is configured so that the predetermined priority favors the selection of a website script of the two or more website scripts associated with the selected biller website that has been successfully performed on the biller website more recently over other website scripts of the two or more website scripts associated with the selected biller website that have successfully performed less recently.

In one embodiment, the process for managing website scripts is configured so that the predetermined priority favors the selection of a website script of the two or more website scripts associated with the selected biller website that has been successfully performed on the biller website more times over other website scripts of the two or more website scripts associated with the selected biller website that have been performed on the biller website fewer times.

In one embodiment, the process for managing website scripts is configured so that the predetermined priority favors the selection of a website script of the two or more website scripts associated with the selected biller website that has failed to perform on the biller website fewer times over other website scripts of the two or more website scripts associated with the selected biller website that have failed to perform more times.

In one embodiment, the process for managing website scripts is configured so that the predetermined priority favors the selection of a website script of the two or more website scripts associated with the selected biller website that has been submitted by more users over other website scripts of the two or more website scripts associated with the selected biller website that have been submitted by fewer users.

In one embodiment, the process for managing website scripts includes generating an ordered list of the two or more website scripts associated with the selected biller website according to how each website script in the plurality best meets the predetermined priority as compared with the other website scripts of the two or more website scripts associated with the selected biller website.

In one embodiment, the process for managing website scripts includes selecting an ordered list website script from the ordered list that best meets the predetermined priority as compared with the other website scripts of the two or more website scripts associated with the selected biller website and then performing the selected ordered list website script on biller website data of the biller website.

If, in one embodiment, the selected ordered list website script failed to perform successfully, the process for managing website scripts includes recording the failed performance of the selected ordered list website script. The process for managing website scripts thus further includes selecting a next-best ordered list website script from the ordered list, and performing the next-best ordered list website script on biller website data of the biller website.

If, in one embodiment, the selected ordered list website script instead performed successfully, the process for managing website scripts includes recording data associated with the successful performance of the selected ordered list website script.

In one embodiment, the process for managing website scripts includes comparing one or more features of the user account with one or more operations of the website scripts associated with the biller website.

In one embodiment, the process for managing website scripts includes determining, as a result of the comparison, one or more of the website scripts associated with the biller website that have no chance of being successfully performed.

In one embodiment, the process for managing website scripts includes excluding one or more of the website scripts associated with the biller website from being selected, based on the excluded one or more website scripts having been determined to have no chance of being successfully performed.

In one embodiment, the process for managing website scripts includes performing a decommissioning process on a website script of the two or more website scripts associated with the selected biller, in order to remove the decommissioned websites from further selection processes, due to those decommissioned website scripts not performing properly, for whatever reason.

In one embodiment, the decommissioning process includes selecting a first website script associated with the selected biller, and aggregating event data associated with the selected website script. In one embodiment, the event data includes one or more records of attempts to perform the first website script on website data of the biller website. In one embodiment, the records of attempts include one or more of a date and/or time of each attempt, and a result of each attempt, the result including whether performance of the first website script on the website data of the biller website was successful or unsuccessful.

In one embodiment, the decommissioning process further includes ordering the event data according to the date and/or time of each attempt.

In one embodiment, the decommissioning process further includes dividing the ordered event data into a predetermined number of groups, with each group containing attempts made during time periods not overlapping a time period of any other group in the predetermined number of groups.

In one embodiment, the decommissioning process further includes assigning a different weight to each group, each weight being a positive number, with groups having more recent time periods having higher value weights than groups having less recent time periods.

In one embodiment, the decommissioning process further includes assigning a value to each attempt in each group equal to the weight of the group the attempt is in.

In one embodiment, the decommissioning process further includes performing a sum of the values of the successful attempts over all groups and subtracting from the sum a total of all values associated with failed attempts, resulting in a performance value.

In one embodiment, the decommissioning process further includes determining whether the performance value exceeds a decommissioning threshold.

In one embodiment, if the decommissioning threshold exceeds the performance value, the decommissioning process further includes recording data associated with the website script that the script is decommissioned and therefore is no longer available for use.

In one embodiment, if the performance value exceeds the decommissioning threshold the decommissioning process further includes terminating the decommissioning process for the selected website script.

In one embodiment, the predetermined number of groups is four.

In one embodiment, the decommissioning process further includes that the decommissioning threshold is zero.

In one embodiment, the predetermined number of groups varies based on the number of attempts being considered in the decommissioning process.

In one embodiment, if the decommissioning threshold exceeds the performance value, the decommissioning process further includes recording data associated with the website script that the script is decommissioned and therefore is no longer available for use by any community user, but the script remains available for use by a user who originally submitted the website script.

In one embodiment, selecting a website script of the two or more website scripts associated with the selected biller comprises selecting a website script of the two or more active, and thus not decommissioned, website scripts associated with the selected biller that have not been successfully performed on behalf of any user within a most recent predetermined performance threshold period. Of course, if the selected script fails one or more times, it will be selected less often, and may be decommissioned, according to the processes disclosed herein.

In one embodiment, the predetermined performance threshold period is 24 hours.

In one embodiment, the predetermined performance threshold period is within a predetermined threshold number of minutes of a mean time between login events of users associated with the selected website login script.

In one embodiment, the decommissioning process further includes wherein the event data includes records of the attempts which span a period at least twice the length of the predetermined performance threshold period.

Figure 1:
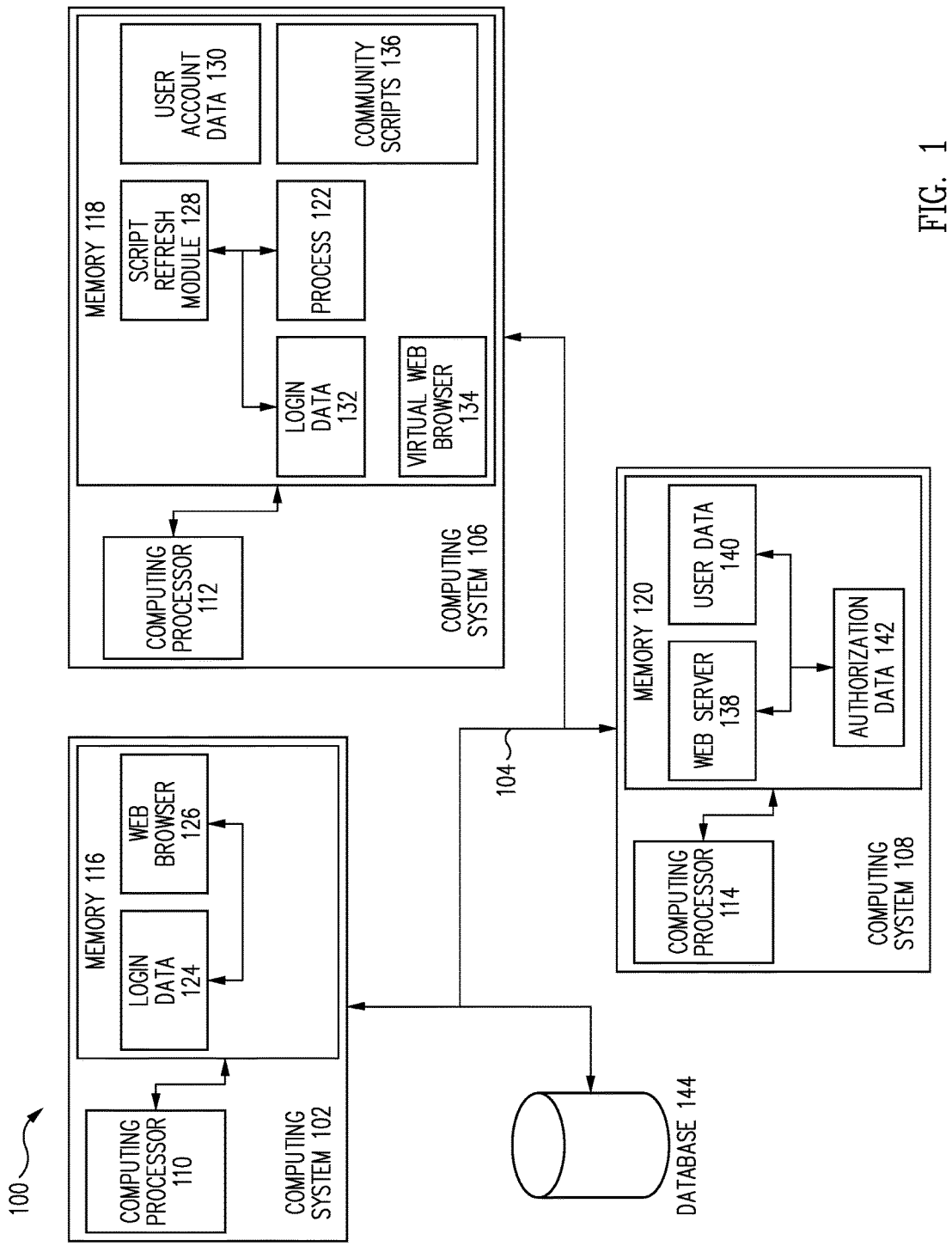
FIG. 1 is a functional block diagram showing the interaction of various elements for implementing one embodiment of a system and method for managing website scripts.

Common reference numerals are used throughout the figures and the detailed description to indicate like elements. One skilled in the art will readily recognize that the figures are examples and that other architectures, modes of operation, orders of operation and elements/functions can be provided and implemented without departing from the characteristics and features of the invention, as set forth in the claims. Unless specifically stated, operations discussed herein may be implemented in any order or combined, as determined by the designer of a system implementing the subject matter described herein.

DETAILED DESCRIPTION

A system and method for managing website scripts includes operations which provide for selection and automatic management of community contributed website scripts in order to provide efficient operation for consumer users and computing systems providing services on their behalf. Periodically, at least once during each refresh period, one or more website scripts are selected to be automatically performed on a biller website, based on a predetermined priority, and if the selected script performs successfully for a given user account, no further script operations are required to be performed on the same website for that particular user account during that same refresh period.

A system and method for managing website scripts further includes decommissioning operations which provide for automatic decommissioning of community contributed website scripts that are functioning below a predetermined minimum performance threshold level.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to convey the principles of the invention, as set forth in the claims, to those of skill in the art.

FIG. 1 is a functional block diagram showing the interaction of various elements for implementing one embodiment of a system and method for managing website scripts.

Referring to FIG. 1, in one embodiment, system 100 for managing website scripts includes one or more of a first computing system, such as computing system 102, operatively coupled through one or more communication channels, such as communication channel 104, to a third party computing system, such as computing system 106, and to a biller computing system, such as computing system 108.

In one embodiment, computing systems 102, 106, and 108 each have one or more respective computing processors, such as computing processors 110, 112, and 114. Computing systems 102, 106, and 108 each also have one or more respective memories, such as memories 116, 118, and 120. Computing processors 110, 112, and 114 are respectively coupled to memories 116, 118, and 120, and are thus configured to execute instructions stored in those respective memories, for example, computing processor executable instructions to perform a process, such as process for managing website scripts 122 of computing system 106.

As used herein, the term "computing system" includes, but is not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the term computing system can denote, but is not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network", or alternatively, "communication channel", includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

In one embodiment, memory 116 of computing system 102 includes login data 124 and web browser 126. In one embodiment, a user of computing system 102 is an authorized user of a user account of computing system 106, represented within user account data 130. User account data 130, in one embodiment, includes authorization data which, when matched by other data, such as login data 124 of computing system 102, authorizes the user of computing system 102 to perform one or more tasks of computing system 106. In one embodiment, the user of computing system 102 interacts with and provides user input for computing system 106 through web browser 126 of computing system 102 to trigger one or more website script refreshes, performed by script refresh module 128. A website script refresh reconfirms that a given website script still performs successfully for one or more users, gathering user data successfully according to the operations set forth by the given website script.

Although login data 124 is shown as being present within memory 116 of computing system 102, that login data is, in one embodiment, provided by a user of computing system 102 when prompted by one or more processes of computing system 106 through web browser 126 of computing system 102. Alternatively, in one embodiment, login data 132 of computing system 106 may be provided at any appropriate later point in time, prior to that login data, such as login data 132, being needed by computing system 106 for one or more script operations.

Again, once appropriate data has been supplied by the user of computing system 102, such as login data 124, and computing system 106 has determined that the provided login data, such as login data 124, matches authorization information of user account data 130, the user of computing system 102 is deemed to be an authorized user of computing system 106.

In one embodiment, once a user of computing system 102 has been deemed to be an authorized user of computing system 106, the authorized user then provides, in one embodiment, user input through web browser 126 to trigger one or more script refresh operations associated with one or more biller websites.

Script refresh operations associated with a particular website script, in one embodiment, perform all operations evidenced by the website script, thus gathering user data associated with the authorized user of computing system 102, typically by performing operations known to those of ordinary skill as screen scraping.

In one embodiment, memory 118 of computing system 106 includes login data 132, virtual web browser 134, and community scripts 136. In one embodiment, login data 132 includes login data of users of computing system 106, for example, the user of computing system 102, wherein the data of login data 132 is used to gain authorization to biller websites, such as a website of computing system 108 provided by web server 138.

Virtual web browser 134, in one embodiment, is used by one or more processes of computing system 106, such as process for managing website scripts 122, both to gain authorization to, on behalf of an authorized user, and load webpages of websites, such as the website of computing system 108 provided by web server 138. In one embodiment, virtual web browser 134 loads webpages but does not display them. Website script operations are performed on the data representing the loaded webpages, but there is typically no need for a user to view a visual representation of that data.

In one embodiment, following a webpage being loaded by computing system 106 into virtual web browser 134, one or more operations of a selected website script of community scripts 136 will be performed on the website of computing system 108.

In one embodiment, memory 120 of computing system 108 includes web server 138, user data 140, and authorization data 142. In typical operation, web server 138 is provided by a biller, such as a merchant or other business the user of computing system 102 does business with. For example, in one embodiment, a biller is a utility company having a website provided by web server 138. Authorization data 142, in one embodiment, must be matched by user login data, such as login data 132, which is associated with the user of computing system 102, before web server 138 will display user specific data, such as user data 140.

Recall that, in one embodiment, user input by a user of computing system 102 through web browser 126 to computing system 106 triggers, in one embodiment, a script refresh cycle. That script refresh cycle initiates login, by computing system 106, on behalf of the user of computing system 102, to the biller website produced by web server 138. Computing system 106 loads the biller website produced by web server 138 into virtual web browser 134, and provides login data 132 to web server 138 in order to become an authorized user of computing system 108, triggering the website provided by web server 138 to prepare and provide a user specific webpage which includes user data 140.

User data 140 includes, in one embodiment, information specific to, for example, an account the user has with the biller, such as an account status including how much is owed by the user to the biller, when payment is due, what the last payment was, when the last payment took place, and any other information specific to the user that is deemed appropriate.

Thus, in one embodiment, once the user specific information is prepared into a user specific webpage loaded by virtual web browser 134 of computing system 106, a website script of community scripts 136 is selected by process for managing website scripts 122, according to predetermined priority criteria set forth by script refresh module 128.

Although various data has been described as being associated with particular computing systems, such as login data 124 being associated with computing system 102, and user account data 130, login data 132, and community scripts 136 being associated with computing system 106, and user data 140 and authorization data 142 being associated with computing system 108, those of ordinary skill will readily appreciate that one or more processes described herein, such as process for managing website scripts 122, may also be designed to utilize external storage, such as database 144, in conjunction with or alternative to using the various memories and/or other storage mechanisms of the various computing systems, such as a hard drive, DVD, or other storage mechanism.

In one embodiment, one or more of the processes discussed herein are automatic, and are performed regularly, without human intervention.

Figure 2:
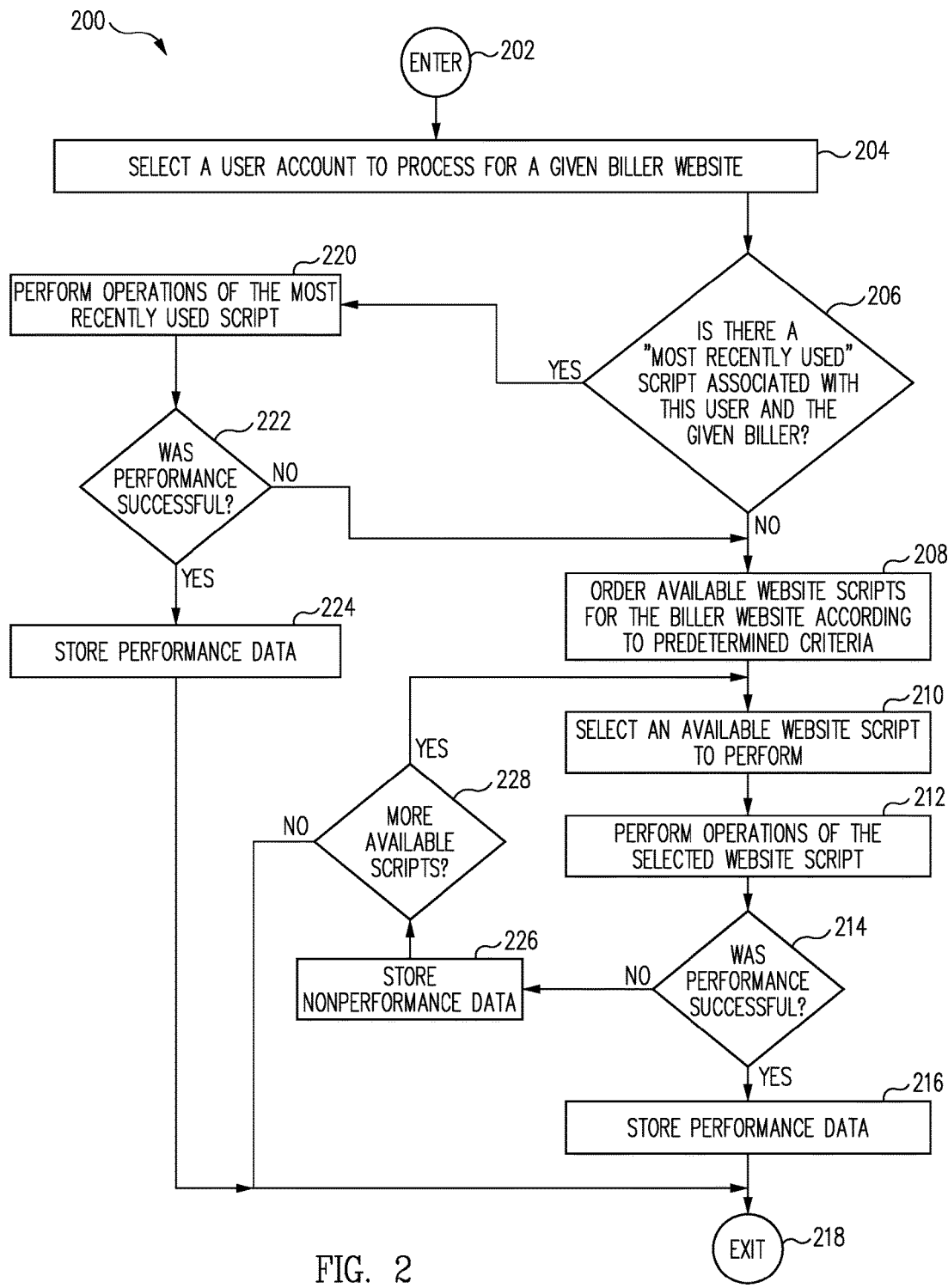
FIG. 2 is a flow chart depicting a process for managing website scripts in accordance with one embodiment.

FIG. 2 is a flowchart depicting a process for managing website scripts in accordance with one embodiment.

In one embodiment, a process for managing website scripts, such as process for managing website scripts 122, includes receiving website scripts from consumer computing system users, the website scripts each being associated with a biller website and configured with one more scripting operations for gathering data from one or more webpages of the biller website.

Users of the biller websites are most familiar with their own data, and are thus uniquely well-positioned to assist with and perform website script creation operations.

For the discussion that follows, it shall be assumed that two or more website scripts have been created by one or more authorized users of computing system 106, wherein the one or more authorized users of computing system 106 are also authorized users of the website provided by computing system 108. In one embodiment, computing system 106 has many users, at least several of which have created website scripts associated with the same biller website.

Referring to FIG. 1 and FIG. 2 together, a process for selecting and performing a website script 200 begins at ENTER OPERATION 202 and proceeds with SELECT A USER ACCOUNT TO PROCESS FOR A GIVEN BILLER WEBSITE OPERATION 204.

In one embodiment, over a predetermined performance period, such as, for example, every 24 hours, system 100 attempts to perform each of the active website scripts listed in community scripts 136 of computing system 106. Some website scripts listed in community scripts 136 may not be active, and in one embodiment, are listed, but marked as decommissioned for one reason or another.

In one embodiment, the predetermined performance threshold period is within a predetermined threshold number of minutes of a mean time between login events of users associated with the selected website login script.

In one embodiment, at SELECT A USER ACCOUNT TO PROCESS FOR A GIVEN BILLER WEBSITE OPERATION 204, a user account of computing system 106 is selected for website script processing. Thus, the selected user account and associated user account data, such as will be found in user account data 130, and login data 132, will be used to perform one or more website scripts of community scripts 136 on one or more biller websites, such as a website provided by computing system 108. The selected user account, in one embodiment, is at least associated with at least one biller account of one biller having a website for which one or more website scripts exists, such as might be found in community scripts 136 or database 144. If there are multiple billers associated with the selected user account that have a website for which one or more website scripts exists, one of those biller accounts is selected for website script processing, such as a script refresh discussed above. Following completion of one or more processes discussed herein, the remaining billers of the selected user may be processed either one at a time, or in parallel, until all of the biller websites associated with billers of the selected user account have been processed.

In one embodiment, once a user account of computing system 106 is selected for website script processing, at SELECT A USER ACCOUNT TO PROCESS FOR A GIVEN BILLER WEBSITE OPERATION 204, process flow proceeds with IS THERE A "MOST RECENTLY USED" SCRIPT ASSOCIATED WITH THIS USER AND THE GIVEN BILLER? OPERATION 206.

In one embodiment, at IS THERE A "MOST RECENTLY USED" SCRIPT ASSOCIATED WITH THIS USER AND THE GIVEN BILLER? OPERATION 206, a determination is made as to whether any website scripts have ever been run for this user/biller combination. For example, in the case of a selected user having a utility company account with their local electric company, a determination is made, at IS THERE A "MOST RECENTLY USED" SCRIPT ASSOCIATED WITH THIS USER AND THE GIVEN BILLER? OPERATION 206 as to whether any website scripts have ever been run on behalf of this user with respect to the local electric company website.

If, at IS THERE A "MOST RECENTLY USED" SCRIPT ASSOCIATED WITH THIS USER AND THE GIVEN BILLER? OPERATION 206 a determination is made that no website scripts have ever been run on behalf of this user with respect to the particular biller, this determination is an indication that the selected user has not created a successfully performing script for this particular biller, or the selected user would already be associated with data reflecting that the script the selected user created was the most recently used script for this particular biller.

If, at IS THERE A "MOST RECENTLY USED" SCRIPT ASSOCIATED WITH THIS USER AND THE GIVEN BILLER? OPERATION 206 a determination is made that no website scripts have ever been run on behalf of this user with respect to the particular biller, process flow proceeds with ORDER AVAILABLE WEBSITE SCRIPTS FOR THE BILLER WEBSITE ACCORDING TO PREDETERMINED CRITERIA OPERATION 208.

In one embodiment, at ORDER AVAILABLE WEBSITE SCRIPTS FOR THE BILLER WEBSITE ACCORDING TO PREDETERMINED CRITERIA OPERATION 208, the available website scripts associated with the particular biller and thus the biller website are isolated from other website scripts for other billers. In one embodiment, the available active website scripts associated with the particular biller are sorted/ordered according to predetermined criteria.

In one embodiment, the predetermined criteria includes one or more of the most recent successful execution dates of each active script, the number of successful performances of each active website script for this particular biller over a predetermined recent time period, such as over the most recent 24 or 48 hours, or any other applicable recent time period, and the number of failed performances of each active website script over a predetermined recent time period, such as over the most recent 24 or 48 hours, or any other applicable recent time period. Other predetermined criteria may be used to sort or order the available active website scripts associated with this particular given biller.

In one embodiment, the predetermined criteria include the length or number of operations associated with the website scripts. In one embodiment, the predetermined criteria indicates a preference for longer scripts, or those having more operations, being at the top of the of sorted/ordered list because longer scripts or scripts having more operations have a tendency to be more complete and thus gather more data of the user from the biller website. In one embodiment, the predetermined criteria indicates a preference for shorter scripts, or those having fewer operations, because those shorter scripts tend to fail less frequently, and/or perform in less time.

In one embodiment, at ORDER AVAILABLE WEBSITE SCRIPTS FOR THE BILLER WEBSITE ACCORDING TO PREDETERMINED CRITERIA OPERATION 208, a website script is not considered to be available or active for a particular selected user if there is no chance that the website script can be successfully performed on the biller website for the particular selected user. For example, if the website script was created by a community user that used three elements of data to authenticate themselves with the biller website, such as a username and a password and a personal identification number, but the current user only authenticates themselves with the biller website using two pieces of identification, such as a username and a password, the website script requiring three elements of data to authenticate a user would fail, since a website script must perform all website script operations entirely successfully in order for a given website script performance to be deemed successful. Thus, such a website script that would necessarily fail is excluded automatically, based on the comparison between one or more characteristics of the user account with one or more characteristics and/or operations of the website script.

Thus, in one embodiment, at ORDER AVAILABLE WEBSITE SCRIPTS FOR THE BILLER WEBSITE ACCORDING TO PREDETERMINED CRITERIA OPERATION 208, one or more website scripts associated with the biller website are excluded from further processing with respect to this selected user, because of the one or more excluded website scripts having no possibility of performing successfully.

In one embodiment, once the available website scripts are sorted/ordered, at ORDER AVAILABLE WEBSITE SCRIPTS FOR THE BILLER WEBSITE ACCORDING TO PREDETERMINED CRITERIA OPERATION 208, process flow proceeds with SELECT AN AVAILABLE WEBSITE SCRIPT TO PERFORM OPERATION 210.

In one embodiment, at SELECT AN AVAILABLE WEBSITE SCRIPT TO PERFORM OPERATION 210, an available website script of the ordered list of ORDER AVAILABLE WEBSITE SCRIPTS FOR THE BILLER WEBSITE ACCORDING TO PREDETERMINED CRITERIA OPERATION 208 is selected to be performed in its entirety. In one embodiment, the selected website script will be a website script at the top of the ordered list of ORDER AVAILABLE WEBSITE SCRIPTS FOR THE BILLER WEBSITE ACCORDING TO PREDETERMINED CRITERIA OPERATION 208, because the selected website script meets the predetermined criteria most closely as compared with other website scripts in the ordered list.

In one embodiment, following the selection of a website script to perform, at SELECT AN AVAILABLE WEBSITE SCRIPT TO PERFORM OPERATION 210, process flow proceeds with PERFORM OPERATIONS OF THE SELECTED WEBSITE SCRIPT OPERATION 212.

In one embodiment, at PERFORM OPERATIONS OF THE SELECTED WEBSITE SCRIPT OPERATION 212, each of the operations indicated by the website script selected at SELECT AN AVAILABLE WEBSITE SCRIPT TO PERFORM OPERATION 210 are performed on the biller website. In one embodiment, the selected website script includes one or more operations such as, but not limited to, logging in to the biller website on behalf of and thus using login data of the user, such as a username and password such as might be represented in login data 132, going to a location of a webpage of the biller website indicating an amount of money owed by the user to the biller and determining an amount owed by the user to the biller, going to a different location of the same webpage of the biller website, or of a different webpage of the biller website and determining a date a next payment is due, and any other website script operations of the selected available website script.

At any time during the performance of one or more operations of selected website script, performance may not end successfully. In one embodiment, performance of the operations of the selected website script terminates on the failure of any one or more operations of the selected website script.

In some circumstances, it may be beneficial to continue to perform further operations of the website script selected at SELECT AN AVAILABLE WEBSITE SCRIPT TO PERFORM OPERATION 210. In one embodiment, performance of the operations of the selected website script continues even though one or more operations of the selected website script may have performed unsuccessfully.

In one embodiment, once the performance of some or all of the operations of the selected website script had been performed at PERFORM OPERATIONS OF THE SELECTED WEBSITE SCRIPT OPERATION 212, process flow proceeds with WAS PERFORMANCE SUCCESSFUL? OPERATION 214.

In one embodiment, at WAS PERFORMANCE SUCCESSFUL? OPERATION 214, a determination is made as to whether each one of the operations of the selected website script performed successfully. If so, in one embodiment, process flow proceeds with STORE PERFORMANCE DATA OPERATION 216.

In one embodiment, at STORE PERFORMANCE DATA OPERATION 216, data pertaining to the successful performance of the selected website script is added into or associated with the selected website script, for example into community scripts 136. In one embodiment, at STORE PERFORMANCE DATA OPERATION 216, data pertaining to the successful performance of the selected website script includes, but is not limited to, one or more of a date of successful completion of the performance of operations of the website script, a time of successful completion of the performance of operations of the website script, and any other data that a designer of process for managing website scripts 122 deems appropriate, for example, for use when sorting/ordering scripts at ORDER AVAILABLE WEBSITE SCRIPTS FOR THE BILLER WEBSITE ACCORDING TO PREDETERMINED CRITERIA OPERATION 208.

In one embodiment, at STORE PERFORMANCE DATA OPERATION 216, data is added to or updated within user account data 130 reflecting that the selected website script performed successfully for the particular user associated with the user account. Such information, for example, and in one embodiment, may be used to determine which script was most recently used by this user for this biller as seen above at IS THERE A "MOST RECENTLY USED" SCRIPT ASSOCIATED WITH THIS USER AND THE GIVEN BILLER? OPERATION 206.

In one embodiment, once relevant performance data is stored and/or recorded at STORE PERFORMANCE DATA OPERATION 216, process for managing scripts 122 process flow proceeds with EXIT OPERATION 218, the process ends and awaits another opportunity to select a biller/website/script combination to perform.

In one embodiment, if, at IS THERE A "MOST RECENTLY USED" SCRIPT ASSOCIATED WITH THIS USER AND GIVEN BILLER OPERATION 206, a determination is made that a currently active website script has previously been run on behalf of this user with respect to the particular biller, the script identified as being the most recently performed script for this user and this biller website is selected to be performed. In one embodiment, once the most recently used script has been selected, process flow proceeds with PERFORM OPERATIONS OF THE MOST RECENTLY USED SCRIPT OPERATION 220.

In one embodiment, at PERFORM OPERATIONS OF THE MOST RECENTLY USED SCRIPT OPERATION 220, each of the operations indicated by the most recently used website script are performed on the biller website. As outlined above, in one embodiment, the selected website script includes one or more operations such as, but not limited to, logging in to the biller website on behalf of and thus using login data of the user, such as a username and password such as might be represented in login data 132, going to a location of a webpage of the biller website indicating an amount of money owed by the user to the biller and determining an amount owed by the user to the biller, going to a different location of the same webpage of the biller website, or of a different webpage of the biller website and determining a date a next payment is due, and any other website script operations of the selected available website script.

At any time during the performance of one or more operations of the selected website script, performance may not end successfully. In one embodiment, performance of the operations of the selected website script terminates on the failure of any one or more operations of the selected website script.

In some circumstances, it may be beneficial to continue to perform further operations of the selected website script. In one embodiment, performance of the operations of the selected website script continues even though one or more operations of the selected website script may not have performed successfully. Though performance may continue, in one embodiment, the performance will have been unsuccessful, since a successful performance is when all website script operations associated with a selected website script perform successfully.

In one embodiment, once the performance of some or all of the operations of the selected website script had been performed at PERFORM OPERATIONS OF THE MOST RECENTLY USED SCRIPT OPERATION 220, process flow proceeds with WAS PERFORMANCE SUCCESSFUL? OPERATION 222.

In one embodiment, at WAS PERFORMANCE SUCCESSFUL? OPERATION 222, a determination is made as to whether each one of the operations of the selected most recently used website script performed successfully.

If not, and there are other active available scripts that may be performed, process flow proceeds with ORDER AVAILABLE WEBSITE SCRIPTS FOR THE BILLER WEBSITE ACCORDING TO PREDETERMINED CRITERIA OPERATION 208 as previously outlined.

At any time during process for selecting and performing a website script 200 only one script is available to select, in one embodiment, the process branches to SELECT AN AVAILABLE WEBSITE SCRIPT TO PERFORM OPERATION 210 where that one remaining active available script is selected and performed.

If, in one embodiment, at WAS PERFORMANCE SUCCESSFUL? OPERATION 222, a determination is made that each one of the operations of the selected most recently used website script performed successfully, process flow proceeds with STORE PERFORMANCE DATA OPERATION 224.

In one embodiment, at STORE PERFORMANCE DATA OPERATION 224, data pertaining to the successful performance of the selected website script is added into or associated with the selected website script, for example into community scripts 136 of FIG. 1. In one embodiment, at STORE PERFORMANCE DATA OPERATION 224, data pertaining to the successful performance of the selected website script includes, but is not limited to, one or more of a date of successful completion of the performance of operations of the website script, a time of successful completion of the performance of operations of the website script, and any other data that a designer of process for managing website scripts 122 deems appropriate, for example, for use when sorting/ordering scripts at ORDER AVAILABLE WEBSITE SCRIPTS FOR THE BILLER WEBSITE ACCORDING TO PREDETERMINED CRITERIA OPERATION 208.

Previously discussed above was an embodiment of WAS PERFORMANCE SUCCESSFUL? OPERATION 214, where a determination is made as to whether each one of the operations of the selected website script performed successfully, and if so, in one embodiment, process flow proceeded with STORE PERFORMANCE DATA OPERATION 216.

In one embodiment at WAS PERFORMANCE SUCCESSFUL? OPERATION 214, a determination is made that at least one operation of the selected website script performed unsuccessfully. In this situation, process flow proceeds with STORE NONPERFORMANCE DATA OPERATION 226.

In one embodiment, at STORE NONPERFORMANCE DATA OPERATION 226, data pertaining to the unsuccessful performance of the selected website script is added into or associated with the selected website script, for example into community scripts 136 of FIG. 1. In one embodiment, at STORE NONPERFORMANCE DATA OPERATION 226, data pertaining to the unsuccessful performance of the selected website script includes, but is not limited to, one or more of a date of unsuccessful completion of the performance of operations of the website script, a time of completion of the unsuccessful performance of operations of the website script, data indicating one or more particular script operations of the selected website script that failed, and any other data that a designer of process for managing website scripts 122 deems appropriate, for example, for use when sorting/ordering scripts at ORDER AVAILABLE WEBSITE SCRIPTS FOR THE BILLER WEBSITE ACCORDING TO PREDETERMINED CRITERIA OPERATION 208.

In one embodiment, once nonperformance data relating to the unsuccessful performance of the selected website script has been stored at STORE NONPERFORMANCE DATA OPERATION 226, process flow proceeds with MORE AVAILABLE SCRIPTS? OPERATION 228.

In one embodiment, at MORE AVAILABLE SCRIPTS? OPERATION 228, a determination is made as to whether there are more active available website scripts to perform for this user with this particular biller. In one embodiment, the determination of whether there are more active available website scripts to perform includes determining whether all of the website scripts included in the ordered list previously prepared at ORDER AVAILABLE WEBSITE SCRIPTS FOR THE BILLER WEBSITE ACCORDING TO PREDETERMINED CRITERIA OPERATION 208 have been performed. If one or more active available websites have not yet been performed, and there are other active available scripts that may be performed, process flow proceeds with SELECT AN AVAILABLE WEBSITE SCRIPT TO PERFORM OPERATION 210 as previously outlined.

In one embodiment, if, at MORE AVAILABLE SCRIPTS? OPERATION 228, a determination is made that there are no more active available website scripts for this biller website, process flow proceeds with EXIT operation 218 and the process terminates.

Process for selecting and performing a website script 200 provides an opportunity for user contributed website scripts to be performed on relevant biller websites, and records performance history so that website scripts that perform well may be ranked more highly in an ordered list than website scripts that perform less satisfactorily. Advantageously, new users who have never had their data scraped from a biller website will be served through the performance of the highest performing website scripts associated with the billers those new users are associated with. Veteran users will also benefit from having their data scraped using website scripts that have been successfully used on their behalf in the past.

Figure 3:
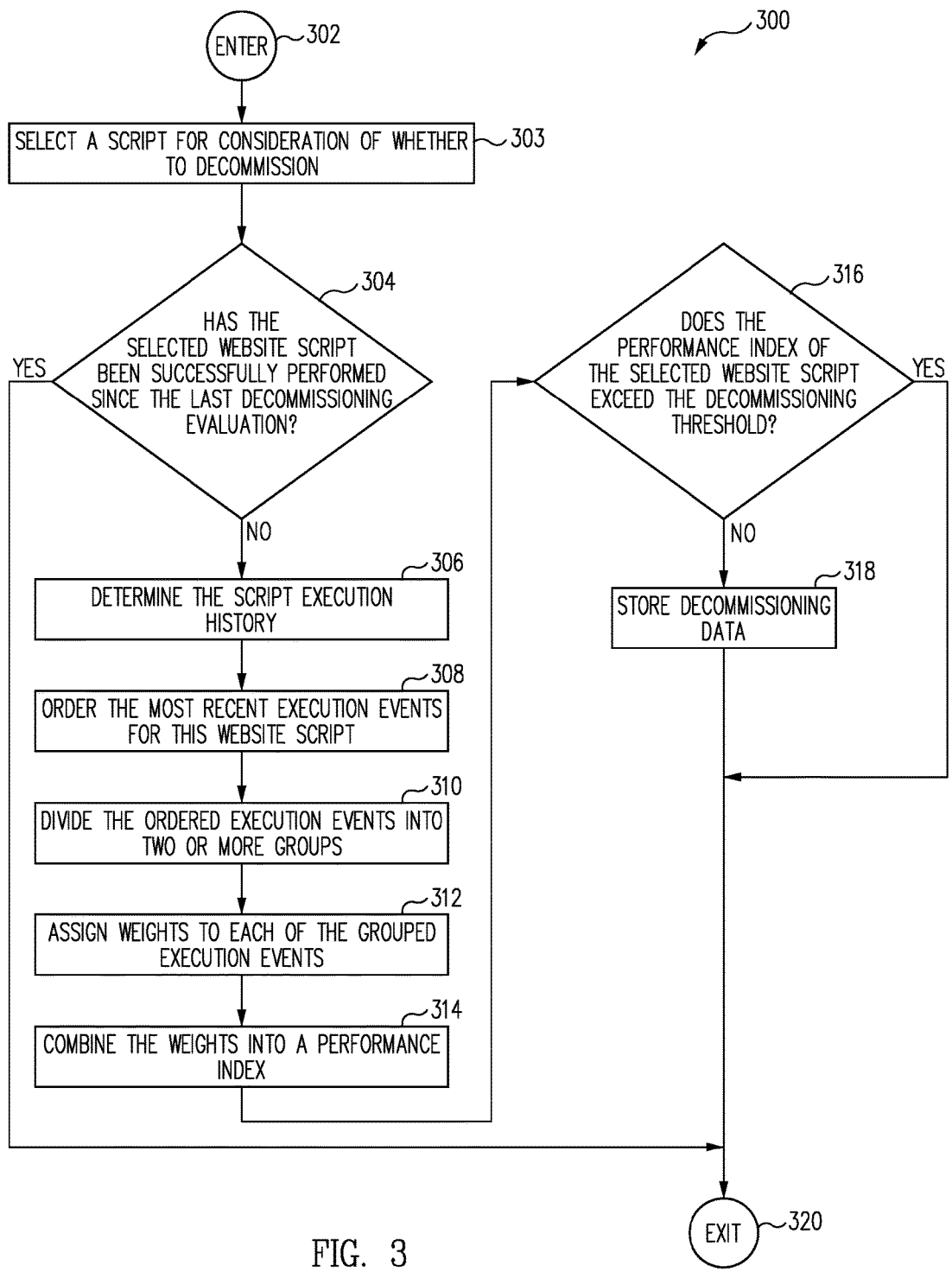
FIG. 3 is a flow chart depicting a process for managing website scripts in accordance with one embodiment.

FIG. 3 is a flow chart depicting a process for managing website scripts in accordance with one embodiment.

Referring to FIG. 1, FIG. 2, and FIG. 3 together, process for determining whether to decommission a script 300 begins at ENTER OPERATION 302 and proceeds with SELECT A SCRIPT FOR CONSIDERATION OF WHETHER TO DECOMMISSION OPERATION 303.

In one embodiment, at SELECT A SCRIPT FOR CONSIDERATION OF WHETHER TO DECOMMISSION OPERATION 303, a website script, for example, of community scripts 136, is selected for consideration of whether that selected website script should be decommissioned. In one embodiment, a script is decommissioned for failure to perform. Failure to perform, in one embodiment includes one or more attempts to perform all operations of the website script, where at least one of the operations of the website script fails for one reason or another. In one embodiment, one reason a website script may fail is because a biller website that the website script is associated with has changed in some way to move or obscure one or more items of data that the website script is attempting to gather.

In one embodiment, SELECT A SCRIPT FOR CONSIDERATION OF WHETHER TO DECOMMISSION OPERATION 303 is combined with SELECT AN AVAILABLE WEBSITE SCRIPT TO PERFORM OPERATION 210 in order to perform both process for selecting and performing a website script 200 and process for determining whether to decommission a script 300 together.

In one embodiment, each currently active website script of community scripts 136 is considered for decommissioning on a regular basis, such as once every 24 hours, once every 48 hours, or periodically at appropriate times determined by the designer of a particular implementation of process for determining whether to decommission a script 300.

In one embodiment, once a script is selected at SELECT A SCRIPT FOR CONSIDERATION OF WHETHER TO DECOMMISSION OPERATION 303, process flow proceeds with HAS THE SELECTED WEBSITE SCRIPT BEEN SUCCESSFULLY PERFORMED SINCE THE LAST DECOMMISSIONING EVALUATION? OPERATION 304.

In one embodiment, at HAS THE SELECTED WEBSITE SCRIPT BEEN SUCCESSFULLY PERFORMED SINCE THE LAST DECOMMISSIONING EVALUATION? OPERATION 304, a determination is made as to whether the selected website script has been performed successfully since the last time this website script has been evaluated for potential decommissioning.

In one embodiment, if the selected website script has been performed successfully, for example, within the last 24 hours, the determination made at HAS THE SELECTED WEBSITE SCRIPT BEEN SUCCESSFULLY PERFORMED SINCE THE LAST DECOMMISSIONING EVALUATION? OPERATION 304 concludes that the selected website script has been performed successfully since the last evaluation for decommissioning has taken place, and process flow would proceed to EXIT OPERATION 320 at which time process for determining whether to decommission a script 300 would end for this particular website script.

Thus, one of skill in the art will readily appreciate that regardless of past performance, if a script has successfully performed recently, it should not be decommissioned. One situation, for example, where a lower performing script would be allowed to remain active is if a user who contributed this script uses it regularly to get their own user data from the associated biller website.

In one embodiment, if, at HAS THE SELECTED WEBSITE SCRIPT BEEN SUCCESSFULLY PERFORMED SINCE THE LAST DECOMMISSIONING EVALUATION? OPERATION 304 the selected website script has not been successfully performed since the last time process for determining whether to decommission a script 300 has been performed, process flow proceeds with DETERMINE THE SCRIPT EXECUTION HISTORY OPERATION 306.

In one embodiment, at DETERMINE THE SCRIPT EXECUTION HISTORY OPERATION 306, the execution history, or performance history, of the selected website script is determined and aggregated. In one embodiment, the script execution history is stored as a collection of events indicating when the selected website script has been performed, whether performances of the script have been successful or not, and other details that may be desirable by the designer of a particular implementation of process for determining whether to decommission a script 300.

In one embodiment, the execution history of any particular website script, such as the website script selected at SELECT A SCRIPT FOR CONSIDERATION OF WHETHER TO DECOMMISSION OPERATION 303, is stored as a series of events in a database such as community scripts 136 or database 144.

Recall that at various times following performance of a website script, for example, during process for selecting and performing a website script 200, performance data and nonperformance data are stored at STORE PERFORMANCE DATA OPERATION 216, STORE PERFORMANCE DATA OPERATION 224 and STORE NONPERFORMANCE DATA OPERATION 226.

In one embodiment, at DETERMINE THE SCRIPT EXECUTION HISTORY OPERATION 306, performance data and nonperformance data associated with the selected website script and previously stored at STORE PERFORMANCE DATA OPERATION 216, STORE PERFORMANCE DATA OPERATION 224 and STORE NONPERFORMANCE DATA OPERATION 226 are determined and/or aggregated.

In one embodiment, at DETERMINE THE SCRIPT EXECUTION HISTORY OPERATION 306, only a subset of the available script execution history is used with process for determining whether to decommission a script 300. For example, in a situation where hundreds of execution events are available which span five or more days, a designer of a particular implementation of process for determining whether to decommission a script 300 may wish to only use a portion of those execution events, for example, 25, 30, 50, or any other number of execution events desired by the designer of the particular implementation.

In one embodiment, the number of execution events used is determined on a sliding scale based on how often the particular website script is performed, and how often process for determining whether to decommission a script 300 is performed. In one embodiment, the number of execution events used equals or exceeds a number of execution events for a particular script over several script refresh periods.

In one example, if process for determining whether to decommission a script 300 is performed once every day for a given website script, and that given website script has 300 total execution events associated with it, and 100 of the execution events are over the most recent three days, then, in one embodiment, process for determining whether to decommission a script 300 uses the number of execution events for the most recent three performance periods, e.g. the most recent three days.

Once the script execution history for the selected website script has been determined and aggregated at DETERMINE THE SCRIPT EXECUTION HISTORY OPERATION 306, process flow proceeds with ORDER THE MOST RECENT EXECUTION EVENTS FOR THIS WEBSITE SCRIPT OPERATION 308.

In one embodiment, at ORDER THE MOST RECENT EXECUTION EVENTS FOR THIS WEBSITE SCRIPT OPERATION 308, individual events of the execution history for the selected website script previously determined and aggregated at DETERMINE THE SCRIPT EXECUTION HISTORY OPERATION 306 are sorted and/or otherwise ordered, into a list for example. In one embodiment, more recently occurring execution events are placed earlier in the list than execution events which took place prior to those recently occurring execution events.

In one embodiment, once individual events of the execution history for the selected website script have been sorted and or otherwise ordered, into a list for example, at ORDER THE MOST RECENT EXECUTION EVENTS FOR THIS WEBSITE SCRIPT OPERATION 308, process flow proceeds to DIVIDE THE ORDERED EXECUTION EVENTS INTO TWO OR MORE GROUPS OPERATION 310.

In one embodiment, at DIVIDE THE ORDERED EXECUTION EVENTS INTO TWO OR MORE GROUPS OPERATION 310, the individual events of the execution history previously ordered at ORDER THE MOST RECENT EXECUTION EVENTS FOR THIS WEBSITE SCRIPT OPERATION 308 will be divided into relatively equal groups according to the ordered list. In one embodiment, for example, if there are 100 individual execution events in the ordered execution history, and if it is determined that four groups is appropriate, each group will have approximately 25 execution events in it, with the first group representing, in one embodiment, the first 25 execution events of the ordered list. Correspondingly, in this example, the second group represents, in one embodiment, the second 25 execution events of the ordered list, and the third group represents, in one embodiment, the third 25 execution events of the ordered list, and the fourth group represents, in one embodiment, the fourth 25 execution events of the ordered list.

Following completion of dividing the ordered execution events of the execution history for the selected website script into a number of relatively equal groups, at DIVIDE THE ORDERED EXECUTION EVENTS INTO TWO OR MORE GROUPS OPERATION 310, process flow proceeds with ASSIGN WEIGHTS TO EACH OF THE GROUPED EXECUTION EVENTS OPERATION 312.

In one embodiment, at ASSIGN WEIGHTS TO EACH OF THE GROUPED EXECUTION EVENTS OPERATION 312, groups of execution events are assigned a weight, with the assigned weight corresponding to how recently execution events of a given group took place.

In one embodiment, groups containing more recent execution events will be assigned higher weights then groups containing less recent execution events. For example, using the example above, and the four groups, wherein the first group represents more recent execution events and the fourth group represents less recent execution events, a particular designer of a given implementation of process for determining whether to decommission a script 300 may, for example, assign the first group a weight of four, the second group a weight of three, the third group a weight of two, and the fourth group a weight of one. Other weights may be used based on whether a particular designer of a given implementation of process for determining whether to decommission a script 300 wishes to emphasize or deemphasize a particular set of execution events over another based on known events, for example, server outages, communication channel breakdown between, for example, computing system 106 and computing system 108, or for any other reason.

In one embodiment, each member of a particular group of execution events receives the same value. Using the example above, where there are 25 execution events in group 1, and group one has a weight of four, each execution event of group 1 is worth a value of four. Correspondingly, for the 25 execution events of group 2, with group 2 having a weight of three, each execution event of group 2 is worth a value of three.

Following completion of assigning weights to each group, at ASSIGN WEIGHTS TO EACH OF THE GROUPED EXECUTION EVENTS OPERATION 312, process flow proceeds with COMBINE THE WEIGHTS INTO A PERFORMANCE INDEX OPERATION 314.

In one embodiment, at COMBINE THE WEIGHTS INTO A PERFORMANCE INDEX OPERATION 314, the various weights assigned to the execution events of each group are combined as follows.

In one embodiment, the value of each successfully performed execution event is summed with each other value of successfully performed execution events, over all groups, resulting in a successfully performed execution value.

In one embodiment, the value of each unsuccessfully performed execution event is summed with each other value of unsuccessfully performed execution events, over all groups, resulting in an unsuccessfully performed execution value.

In one embodiment the unsuccessfully performed execution value is then subtracted from the successfully performed execution value, resulting in a performance index.

Those of ordinary skill in the art will readily appreciate that there are numerous variations of the above that may be performed in any order, in order to arrive at a performance index. For example, instead of assigning each execution event of a group the same value, and then summing the values of successfully performed execution events over each group, and subtracting from that sum a total of values of unsuccessfully performed execution events, each successfully performed execution event in a given group may be assigned a positive number corresponding to the desired weight, and each unsuccessfully performed execution event in a given group may be assigned a negative number of the same magnitude, and then each member of each group is simply summed together, resulting in the performance index. Other ways of accomplishing the goal of developing a performance index will be readily appreciated by persons of ordinary skill.

In one embodiment, once a performance index is determined at COMBINE THE WEIGHTS INTO A PERFORMANCE INDEX OPERATION 314, process flow proceeds with DOES THE PERFORMANCE INDEX OF THE SELECTED WEBSITE SCRIPT EXCEED THE DECOMMISSIONING THRESHOLD? OPERATION 316.

In one embodiment, at DOES THE PERFORMANCE INDEX OF THE SELECTED WEBSITE SCRIPT EXCEED THE DECOMMISSIONING THRESHOLD? OPERATION 316, a comparison of the performance index determined at COMBINE THE WEIGHTS INTO A PERFORMANCE INDEX OPERATION 314 is made with a decommissioning threshold which sets forth the minimum performance index a website script must have in order to remain active and available for use by one or more users.

In one embodiment, the decommissioning threshold is set higher for stricter decommissioning standards which will result in scripts being decommissioned more readily. In one embodiment, the decommissioning threshold is set lower for less aggressive decommissioning standards which will result in scripts being decommissioned less frequently.

In one embodiment, the decommissioning threshold is zero. In this example, where the decommissioning threshold is zero, website scripts having performance thresholds that are equal to or greater than zero are allowed to remain active, while website scripts having performance thresholds that are less than zero are decommissioned and therefore made unavailable for use.

In one embodiment, a website script that is decommissioned is merely listed as such and the script remains reflected in community scripts 136, with an optional indicator reflecting why the particular website script was decommissioned. In one embodiment, the optional indicator reflecting why the particular website script was decommissioned includes a notation indicating that the particular website script was decommissioned due to a low performance index. Persons of ordinary skill will readily appreciate that other indicators will be appropriate in other circumstances.

In one embodiment, if the comparison at DOES THE PERFORMANCE INDEX OF THE SELECTED WEBSITE SCRIPT EXCEED THE DECOMMISSIONING THRESHOLD? OPERATION 316 reflects that the performance index of the selected website script meets or exceeds the decommissioning threshold, process flow proceeds to EXIT OPERATION 320 and process for determining whether to decommission a script 300 ends.

In one embodiment, if the comparison at DOES THE PERFORMANCE INDEX OF THE SELECTED WEBSITE SCRIPT EXCEED THE DECOMMISSIONING THRESHOLD? OPERATION 316 reflects that the performance index of the selected website script is less than the decommissioning threshold, process flow proceeds to STORE DECOMMISSIONING DATA OPERATION 318.

In one embodiment, at STORE DECOMMISSIONING DATA OPERATION 318, decommissioning data associated with the selected website script is added or updated to reflect that the selected website script is no longer available for use. In one embodiment, for example, community scripts 136 is updated to reflect that the selected website script is no longer available for use.

In one embodiment, if the decommissioning threshold exceeds the performance value, the decommissioning process further includes recording data associated with the website script that the script is decommissioned and therefore is no longer available for use by any community user, but the script remains available for use by a user who originally submitted the website script.

Process flow then proceeds to EXIT OPERATION 320 and process for determining whether to decommission a script 300 ends.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language, and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for managing website scripts comprising:
   at least one computing processor; and
   at least one memory coupled to the at least one computing processor, the at least one memory having stored therein instructions which when executed by any set of the at least one computing processors, perform a process for managing website scripts comprising:
   selecting a third party user account to process, the third party user account including data reflecting one or more user accounts with a respective number of billers having respective biller websites configured to present user data;
   selecting, from the one or more biller websites associated with the third party user account, a biller website to gather user data from, the selected biller website having a plurality of user-contributed website scripts available for use in gathering, following authentication of a given user as an authorized user, user data from the selected biller website, the plurality of website scripts each being biller website specific, the plurality of user-contributed website scripts having been provided by two or more authorized users of the selected biller website;

determining whether user data of the third party account includes data indicating whether one or more of the plurality of user-contributed website scripts associated with the selected biller website has been previously successfully used to gather user data on behalf of the third party user account;

if user data of the third party account includes data indicating that a particular one or more of the plurality of user-contributed website scripts associated with the selected biller website have been previously successfully used to gather user data on behalf of the third party user account, selecting a user-contributed website script from the one or more of the plurality of user-contributed website scripts associated with the selected biller website that have been previously successfully used to gather user data on behalf of the third party user account;

if user data of the third party account does not include data indicating that a particular one or more of the plurality of user-contributed website scripts associated with the selected biller website have been previously successfully used to gather user data on behalf of the third party user account, selecting a user-contributed website script from the one or more of the plurality of user-contributed website scripts associated with the selected biller website, based on a predetermined priority; and performing the selected user-contributed website script on the selected biller website.

2. The system for managing website scripts of claim 1 wherein the predetermined priority favors the selection of a user-contributed website script of the plurality of user-contributed website scripts associated with the selected biller website that has been successfully performed on the biller website more recently over other user-contributed website scripts of the plurality of user-contributed website scripts associated with the selected biller website that have successfully performed less recently.

3. The system for managing website scripts of claim 1 wherein the predetermined priority favors the selection of a user-contributed website script of the plurality of user-contributed website scripts associated with the selected biller website that has been successfully performed on the biller website more times over other website scripts of the plurality of user-contributed website scripts associated with the selected biller website that have been performed on the biller website fewer times.

4. The system for managing website scripts of claim 1 wherein the predetermined priority favors the selection of a user-contributed website script of the plurality of user-contributed website scripts associated with the selected biller website that has failed to perform on the biller website fewer times over other user-contributed website scripts of the plurality of user-contributed website scripts associated with the selected biller website that have failed to perform more times.

5. The system for managing website scripts of claim 1 wherein the predetermined priority favors the selection of a user-contributed website script of the plurality of user-contributed website scripts associated with the selected biller website that has been submitted by more users over other website scripts of the plurality of user-contributed website scripts associated with the selected biller website that have been submitted by fewer users.

6. The system for managing website scripts of claim 1 further comprising:

generating an ordered list of the plurality of user-contributed website scripts associated with the selected biller website according to how each user-contributed website script in the plurality best meets the predetermined priority as compared with the other user-contributed website scripts of the plurality of user-contributed website scripts associated with the selected biller website;

selecting an ordered list user-contributed website script from the ordered list that best meets the predetermined priority as compared with the other user-contributed website scripts of the plurality of user-contributed website scripts associated with the selected biller website;

performing the selected ordered list website script on biller website data of the biller website;

if the selected ordered list user-contributed website script failed to perform successfully, recording the failed performance of the selected ordered list user-contributed website script, selecting a next-best ordered list user-contributed website script from the ordered list, and performing the next-best ordered list website script on biller website data of the biller website; and if the selected ordered list user-contributed website script performed successfully, recording data associated with the successful performance of the selected ordered list user-contributed website script.

7. The system for managing website scripts of claim 1 further comprising:

comparing one or more features of the user account with one or more operations of the user-contributed website scripts associated with the biller website;

determining, as a result of the comparison, that one or more of the user-contributed website scripts associated with the biller website have no chance of being successfully performed;

excluding one or more of the user-contributed website scripts associated with the biller website from being selected.

8. The system for managing website scripts of claim 1 further comprising:

performing a decommissioning process on one or more of the plurality of user-contributed website scripts associated with the selected biller, the decommissioning process comprising:

selecting a first user-contributed website script of one or more of the plurality of user-contributed website scripts associated with the selected biller;

aggregating event data associated with the first user-contributed website script, the event data including records of attempts to perform the first user-contributed website script on website data of the biller website, a date and/or time of each attempt, and a result of each attempt, the result including whether performance of the first user-contributed website script on the website data of the biller website was successful or unsuccessful;

ordering the event data according to the date and/or time of each attempt;

dividing the event data into a predetermined number of groups, with each group containing attempts made during time periods not overlapping a time period of any other group in the predetermined number of groups;

assigning a different weight to each group, each weight being a positive number, with groups having more recent time periods having higher value weights than groups having less recent time periods;

assigning a value to each attempt in each group equal to the weight of the group the attempt is in;

performing a sum of the values of the successful attempts over all groups and subtracting from the sum a total of all values associated with failed attempts, resulting in a performance value;

determining whether the performance value exceeds a decommissioning threshold;

if the decommissioning threshold exceeds the performance value, recording data associated with the user-contributed website script that the script is decommissioned and therefore is no longer available for use; and if the performance value exceeds the decommissioning threshold, terminating the decommissioning process for the selected user-contributed website script.

9. The system for managing website scripts of claim 8 wherein the predetermined number of groups is four.

10. The system for managing website scripts of claim 8 wherein the decommissioning threshold is zero.

11. The system for managing website scripts of claim 8 wherein the predetermined number of groups varies based on the number of attempts being considered in the decommissioning process.

12. The system for managing website scripts of claim 8 wherein if the decommissioning threshold exceeds the performance value, recording data associated with the user-contributed website script that the script is decommissioned and therefore is no longer available for use comprises:

if the decommissioning threshold exceeds the performance value, recording data associated with the user-contributed website script that the user-contributed website script is decommissioned and therefore is no longer available for use by any community user, but the script remains available for use by a user who originally submitted the user-contributed website script.

13. The system for managing website scripts of claim 8 wherein selecting one or more of the plurality of user-contributed website scripts associated with the selected biller comprises:

selecting one or more of the plurality of user-contributed website scripts associated with the selected biller that have not been successfully performed on behalf of any user within a most recent predetermined performance threshold period.

14. The system for managing website scripts of claim 13 wherein the predetermined performance threshold period is 24 hours.

15. The system for managing website scripts of claim 14 wherein the predetermined performance threshold period is within a predetermined threshold number of minutes of a mean time between login events of users associated with the selected user-contributed website login script.

16. The system for managing website scripts of claim 13 wherein the event data includes records of the attempts which span a period at least twice the length of the predetermined performance threshold period.

17. A system for managing website scripts comprising:
a third party computing system;
a biller website computing system executing a webserver for serving one or more biller websites;
selecting, by the third party computing system, a third party user account to process, the third party user account including data reflecting one or more user accounts with a respective number of billers having respective biller websites configured to present user data;

selecting, by the third party computing system, from the one or more biller websites associated with the third party user account, a biller website to gather user data from, the selected biller website having a plurality of user-contributed website scripts available for use in gathering, following authentication, on behalf of the biller website computing system, of a given user as an authorized user, user data from the selected biller website of the biller website computing system, the plurality of user-contributed website scripts each being biller website specific;

determining, by the third party computing system, whether user data of the third party account includes data indicating whether one or more of the plurality of user-contributed website scripts associated with the selected biller website has been previously successfully used to gather user data on behalf of the third party user account;

if user data of the third party account includes data indicating that a particular one or more of the plurality of user-contributed website scripts associated with the selected biller website have been previously successfully used to gather user data on behalf of the third party user account, selecting, by the third party computing system, a website script from the one or more of the plurality of user-contributed website scripts associated with the selected biller website that have been previously successfully used to gather user data on behalf of the third party user account;

if user data of the third party account does not include data indicating that a particular one or more of the plurality of user-contributed website scripts associated with the selected biller website have been previously successfully used to gather user data on behalf of the third party user account, selecting, by the third party computing system, a user-contributed website script from the one or more of the plurality of user-contributed website scripts associated with the selected biller website, based on a predetermined priority; and performing, by the third party computing system, the selected user-contributed website script on the selected biller website.

18. The system for managing website scripts of claim 17 wherein the predetermined priority favors the selection, by the third party computing system, of a user-contributed website script of the plurality of user-contributed website scripts associated with the selected biller website that has been successfully performed on the biller website more recently over other user-contributed website scripts of the plurality of user-contributed website scripts associated with the selected biller website that have successfully performed less recently.

19. The system for managing website scripts of claim 17 wherein the predetermined priority favors the selection, by the third party computing system, of a user-contributed website script of the plurality of user-contributed website scripts associated with the selected biller website that has been successfully performed on the biller website more times over other user-contributed website scripts of the plurality of user-contributed website scripts associated with the selected biller website that have been performed on the biller website fewer times.

20. The system for managing website scripts of claim 17 wherein the predetermined priority favors the selection, by the third party computing system, of a user-contributed website script of the plurality of user-contributed website scripts associated with the selected biller website that has failed to perform on the biller website fewer times over other user-contributed website scripts of the plurality of user-contributed website scripts associated with the selected biller website that have failed to perform more times.

21. The system for managing website scripts of claim 17 wherein the predetermined priority favors the selection, by the third party computing system, of a user-contributed website script of the plurality of user-contributed website scripts associated with the selected biller website that has been submitted by more users over other user-contributed website scripts of the plurality of user-contributed website scripts associated with the selected biller website that have been submitted by fewer users.

22. The system for managing website scripts of claim 17 further comprising:
- generating, by the third party computing system, an ordered list of the plurality of user-contributed website scripts associated with the selected biller website according to how each user-contributed website script in the plurality best meets the predetermined priority as compared with the other user-contributed website scripts of the plurality of user-contributed website scripts associated with the selected biller website;
- selecting, by the third party computing system, an ordered list user-contributed website script from the ordered list that best meets the predetermined priority as compared with the other user-contributed website scripts of the plurality of user-contributed website scripts associated with the selected biller website;
- performing, by the third party computing system, the selected ordered list user-contributed website script on biller website data of the biller website;
- if the selected ordered list user-contributed website script failed to perform successfully, recording, by the third party computing system, the failed performance of the selected ordered list user-contributed website script, selecting, by the third party computing system, a next-best ordered list user-contributed website script from the ordered list, and performing, by the third party computing system, the next-best ordered list user-contributed website script on biller website data of the biller website; and
- if the selected ordered list user-contributed website script performed successfully, recording, by the third party computing system, data associated with the successful performance of the selected ordered list user-contributed website script.

23. The system for managing website scripts of claim 17 further comprising:
- comparing, by the third party computing system, one or more features of the user account with one or more operations of the user-contributed website scripts associated with the biller website;
- determining, by the third party computing system as a result of the comparison, that one or more of the user-contributed website scripts associated with the biller website have no chance of being successfully performed; and
- excluding, by the third party computing system, one or more of the user-contributed website scripts associated with the biller website from being selected.

24. The system for managing website scripts of claim 17 further comprising:
- performing, by the third party computing system, a decommissioning process on one or more of the plurality of user-contributed website scripts associated with the selected biller, the decommissioning process comprising:
  - selecting, by the third party computing system, a first user-contributed website script of one or more of the plurality of user-contributed website scripts associated with the selected biller;
  - aggregating, by the third party computing system, event data associated with the first user-contributed website script, the event data including records of attempts to perform the first user-contributed website script on website data of the biller website, a date and/or time of each attempt, and a result of each attempt, the result including whether performance of the first user-contributed website script on the website data of the biller website was successful or unsuccessful;
  - ordering, by the third party computing system, the event data according to the date and/or time of each attempt;
  - dividing, by the third party computing system, the event data into a predetermined number of groups, with each group containing attempts made during time periods not overlapping a time period of any other group in the predetermined number of groups;
  - assigning, by the third party computing system, a different weight to each group, each weight being a positive number, with groups having more recent time periods having higher value weights than groups having less recent time periods;
  - assigning, by the third party computing system, a value to each attempt in each group equal to the weight of the group the attempt is in;
  - performing, by the third party computing system, a sum of the values of the successful attempts over all groups and subtracting from the sum a total of all values associated with failed attempts, resulting in a performance value;
  - determining, by the third party computing system, whether the performance value exceeds a decommissioning threshold;
  - if the decommissioning threshold exceeds the performance value, recording, by the third party computing system, data associated with the user-contributed website script that the user-contributed website script is decommissioned and therefore is no longer available for use; and
  - if the performance value exceeds the decommissioning threshold, terminating the decommissioning process for the selected user-contributed website script.

25. The system for managing website scripts of claim 24 wherein the predetermined number of groups is four.

26. The system for managing website scripts of claim 24 wherein the decommissioning threshold is zero.

27. The system for managing website scripts of claim 24 wherein the predetermined number of groups varies based on the number of attempts being considered in the decommissioning process.

28. The system for managing website scripts of claim 24 wherein if the decommissioning threshold exceeds the performance value, recording, by the third party computing system, data associated with the user-contributed website script that the user-contributed website script is decommissioned and therefore is no longer available for use comprises:
- if the decommissioning threshold exceeds the performance value, recording, by the third party computing system, data associated with the website script that the user-contributed website script is decommissioned and therefore is no longer available for use by any community user, but the user-contributed website script remains available for use by a user who originally submitted the user-contributed website script.

29. The system for managing website scripts of claim 24 wherein selecting one or more of the plurality of website scripts associated with the selected biller comprises:
selecting, by the third party computing system, one or more of the plurality of user-contributed website scripts associated with the selected biller that have not been successfully performed on behalf of any user within a most recent predetermined performance threshold period.

30. The system for managing website scripts of claim 29 wherein the predetermined performance threshold period is 24 hours.

31. The system for managing website scripts of claim 30 wherein the predetermined performance threshold period is within a predetermined threshold number of minutes of a mean time between login events of users associated with the selected website login script.

32. The system for managing website scripts of claim 29 wherein the event data includes records of the attempts which span a period at least twice the length of the predetermined performance threshold period.

33. A system for managing website scripts comprising:
performing, by a third party computing system, a decommissioning process on one or more of the plurality of website scripts associated with a biller, the decommissioning process comprising:
selecting, by the third party computing system, a first user-contributed website script of one or more of a plurality of user-contributed website scripts associated with the selected biller;
aggregating, by the third party computing system, event data associated with the first user-contributed website script, the event data including records of attempts to perform the first user-contributed website script on website data of the biller website, a date and/or time of each attempt, and a result of each attempt, the result including whether performance of the first user-contributed website script on the website data of the biller website was successful or unsuccessful;
ordering, by the third party computing system, the event data according to the date and/or time of each attempt;
dividing, by the third party computing system, the event data into a predetermined number of groups, with each group containing attempts made during time periods not overlapping a time period of any other group in the predetermined number of groups;
assigning, by the third party computing system, a different weight to each group, each weight being a positive number, with groups having more recent time periods having higher value weights than groups having less recent time periods;
assigning, by the third party computing system, a value to each attempt in each group equal to the weight of the group the attempt is in;
performing, by the third party computing system, a sum of the values of the successful attempts over all groups and subtracting from the sum a total of all values associated with failed attempts, resulting in a performance value;
determining, by the third party computing system, whether the performance value exceeds a decommissioning threshold;
if the decommissioning threshold exceeds the performance value, recording, by the third party computing system, data associated with the user-contributed website script that the user-contributed website script is decommissioned and therefore is no longer available for use; and
if the performance value exceeds the decommissioning threshold, terminating the decommissioning process for the selected user-contributed website script.

34. The system for managing website scripts of claim 33 wherein the predetermined number of groups is four.

35. The system for managing website scripts of claim 33 wherein the decommissioning threshold is zero.

36. The system for managing website scripts of claim 33 wherein the predetermined number of groups varies based on the number of attempts being considered in the decommissioning process.

37. The system for managing website scripts of claim 33 wherein if the decommissioning threshold exceeds the performance value, recording, by the third party computing system, data associated with the user-contributed website script that the user-contributed website script is decommissioned and therefore is no longer available for use comprises:
if the decommissioning threshold exceeds the performance value, recording, by the third party computing system, data associated with the user-contributed website script that the user-contributed website script is decommissioned and therefore is no longer available for use by any community user, but the user-contributed website script remains available for use by a user who originally submitted the user-contributed website script.

38. The system for managing website scripts of claim 33 wherein selecting one or more of the plurality of website scripts associated with the selected biller comprises:
selecting, by the third party computing system, one or more of the plurality of user-contributed website scripts associated with the selected biller that have not been successfully performed on behalf of any user within a most recent predetermined performance threshold period.

39. The system for managing website scripts of claim 38 wherein the predetermined performance threshold period is 24 hours.

40. The system for managing website scripts of claim 39 wherein the predetermined performance threshold period is within a predetermined threshold number of minutes of a mean time between login events of users associated with the selected website login script.

41. The system for managing website scripts of claim 38 wherein the event data includes records of the attempts which span a period at least twice the length of the predetermined performance threshold period.

* * * * *